US008826000B2

(12) United States Patent
Jacobs et al.

(10) Patent No.: US 8,826,000 B2
(45) Date of Patent: *Sep. 2, 2014

(54) METHOD AND APPARATUS FOR SUPPORTING CRYPTOGRAPHIC-RELATED ACTIVITIES IN A PUBLIC KEY INFRASTRUCTURE

(75) Inventors: Stuart J. Jacobs, Hudson, MA (US); Francis Leo Mannix, Jr., Newton, MA (US); Thomas William Christoffel, Concord, MA (US); Scott Andrew Belgard, Randolph, MA (US)

(73) Assignee: Verizon Laboratories Inc., Basking Ridge, NJ (US)

( * ) Notice: Subject to any disclaimer, the term of this patent is extended or adjusted under 35 U.S.C. 154(b) by 791 days.

This patent is subject to a terminal disclaimer.

(21) Appl. No.: 12/357,749

(22) Filed: Jan. 22, 2009

(65) Prior Publication Data

US 2009/0138702 A1    May 28, 2009

Related U.S. Application Data

(63) Continuation of application No. 09/591,708, filed on Jun. 9, 2000, now Pat. No. 7,493,486.

(51) Int. Cl.
*H04L 29/06* (2006.01)

(52) U.S. Cl.
CPC .......... *H04L 63/0428* (2013.01); *H04L 63/101* (2013.01); *H04L 63/12* (2013.01)
USPC .............................................. 713/153; 380/1

(58) Field of Classification Search
USPC ................. 713/152–155, 158, 165, 175–176; 726/2, 16, 30; 705/57–59; 380/1, 37, 380/54, 229, 232, 100, 132; 711/216
See application file for complete search history.

(56) References Cited

U.S. PATENT DOCUMENTS

| | | | | |
|---|---|---|---|---|
| 4,780,995 | A | 11/1988 | Gittins | 52/60 |
| 5,272,754 | A * | 12/1993 | Boerbert | 713/159 |
| 5,596,718 | A | 1/1997 | Boebert et al. | 726/16 |
| 5,606,617 | A | 2/1997 | Brands | 380/30 |
| 5,668,998 | A | 9/1997 | Mason et al. | 717/104 |
| 5,703,562 | A | 12/1997 | Nilsen | 340/286.02 |
| 5,724,425 | A | 3/1998 | Chang et al. | 705/52 |
| 5,822,434 | A | 10/1998 | Caronni et al. | 713/156 |
| 5,822,435 | A | 10/1998 | Boebert et al. | 713/192 |
| 5,825,880 | A | 10/1998 | Sudia et al. | 713/180 |
| 5,825,890 | A | 10/1998 | Elgamal et al. | 713/151 |
| 5,845,280 | A | 12/1998 | Treadwell et al. | 707/8 |
| 5,850,449 | A | 12/1998 | McManis | 713/161 |
| 5,937,066 | A | 8/1999 | Gennaro et al. | 380/286 |
| 5,983,350 | A | 11/1999 | Minear et al. | 726/11 |
| 5,991,399 | A | 11/1999 | Graunke et al. | 380/279 |
| 6,006,328 | A | 12/1999 | Drake | 726/23 |
| 6,009,177 | A * | 12/1999 | Sudia | 713/191 |
| 6,065,037 | A | 5/2000 | Hitz et al. | 709/200 |
| 6,085,178 | A | 7/2000 | Bigus et al. | 705/80 |
| 6,092,202 | A | 7/2000 | Veil et al. | 726/27 |

(Continued)

*Primary Examiner* — Edward Zee
*Assistant Examiner* — Leynna Truvan

(57) ABSTRACT

In a node (110) communicating with other nodes in a network (150), a system and method for performing cryptographic-related functions is provided. The node (110) receives and transmits inputs and outputs requiring cryptographic-related processing. When cryptographic processing is required, the node (110) transmits a predefined message to a cryptographic processing component in the node (110) that then performs the desired cryptographic-related processing.

18 Claims, 5 Drawing Sheets

(56) References Cited

U.S. PATENT DOCUMENTS

| | | | |
|---|---|---|---|
| 6,157,919 A | 12/2000 | Cordery et al. | 705/60 |
| 6,212,636 B1 | 4/2001 | Boyle et al. | 713/168 |
| 6,226,742 B1 | 5/2001 | Jakubowski et al. | 713/170 |
| 6,233,617 B1 | 5/2001 | Rothwein et al. | 709/227 |
| 6,300,946 B1 | 10/2001 | Lincke et al. | 715/700 |
| 6,311,273 B1 | 10/2001 | Helbig et al. | 726/2 |
| 6,314,468 B1 | 11/2001 | Murphy et al. | 709/236 |
| 6,314,521 B1 | 11/2001 | Debry | 713/201 |
| 6,363,477 B1 | 3/2002 | Fletcher et al. | 713/151 |
| 6,367,012 B1 | 4/2002 | Atkinson et al. | 713/176 |
| 6,374,402 B1 | 4/2002 | Schmeidler et al. | 717/167 |
| 6,378,072 B1 | 4/2002 | Collins et al. | 713/187 |
| 6,385,318 B1 | 5/2002 | Oishi | 380/262 |
| 6,401,206 B1 | 6/2002 | Khan et al. | 713/176 |
| 6,405,316 B1 | 6/2002 | Krishnan et al. | 713/190 |
| 6,405,364 B1 | 6/2002 | Bowman-Amuah | 717/101 |
| 6,412,035 B1 | 6/2002 | Webber | 710/261 |
| 6,502,137 B1 * | 12/2002 | Peterson et al. | 709/229 |
| 6,573,907 B1 | 6/2003 | Madrane | 715/719 |
| 6,606,479 B2 | 8/2003 | Cook et al. | 434/350 |
| 6,609,159 B1 | 8/2003 | Dukach et al. | 719/331 |
| 6,685,778 B2 | 2/2004 | Davis et al. | 118/684 |
| 6,711,264 B1 | 3/2004 | Matsumoto et al. | 380/283 |
| 6,754,696 B1 * | 6/2004 | Kamath et al. | 709/213 |
| 6,839,759 B2 | 1/2005 | Larson et al. | 709/228 |
| 7,000,106 B2 * | 2/2006 | Carter | 713/164 |
| 7,013,469 B2 | 3/2006 | Smith et al. | 719/328 |
| 7,025,209 B2 | 4/2006 | Hawkins | 209/217 |
| 7,080,044 B1 | 7/2006 | Cordery et al. | 705/60 |
| 7,080,097 B2 | 7/2006 | Wu | 707/104.1 |
| 7,167,844 B1 | 1/2007 | Leong et al. | 705/80 |

* cited by examiner

METHOD AND APPARATUS FOR SUPPORTING CRYPTOGRAPHIC-RELATED ACTIVITIES IN A PUBLIC KEY INFRASTRUCTURE

RELATED APPLICATIONS

This is a continuation of U.S. patent application Ser. No. 09/591,708 filed on Jun. 9, 2000, the content of which is relied upon and incorporated herein by reference in its entirety.

GOVERNMENT CONTRACT

The U.S. Government has a paid-up license in this invention and the right in limited circumstances to require the patent owner to license others on reasonable terms as provided for by the terms of Contract No. DAAL01-96-2-002 awarded by the U.S. Army.

FIELD OF THE INVENTION

The present invention relates generally to cryptography and, more particularly, to systems and methods for supporting cryptographic-related activities in a public key infrastructure.

BACKGROUND OF THE INVENTION

Public key cryptography has been commonly used to provide a mechanism to support access control and general authentication services in distributed environments. For example, in networks storing confidential information, conventional systems typically employ access control to limit access to the confidential information to designated parties. These systems may additionally employ general authentication services to authenticate users of various network resources to ensure that originators and recipients of messages are actually the parties they claim to be.

Conventional public key cryptography relies upon public key certificates, such as those defined in ITU X.509, to bind a user's public key reliably to his name and provide users with the high level of assurance desired when identifying other entities. A certificate may be signed using a private key associated with the sender. The recipient of the message can then verify that the message was actually sent by the originator named in the message, provided that the recipient verifies the signature using the sender's public key.

In conventional systems, the responsibility for generating digital signatures and verifying digital signatures is borne by an application program executing on a general-purpose computer, under the control of a general-purpose operating system. For example, a conventional application program running on a computer in a network may have to authenticate link and network control messages. Similarly, the application program may have to encrypt messages using various encryption algorithms before transmitting these messages to other nodes in the network. Such tasks require an application programmer or network developer to acquire detailed knowledge of complex secret and public key algorithms and then develop programs to perform the required cryptographic functions.

Additionally, these cryptographic-related functions may require a network entity to exchange a number of messages with corresponding network entities when establishing a security association (SA). Such exchanges of messages consume very large amounts of network bandwidth, which is often limited in wireless systems.

As a result, there exists a need for a mechanism designed to avoid the requirement for an applications or network developer from having to acquire detailed knowledge of secret and public key algorithms. There is also a need for a mechanism that integrates cryptographic-related functions into a simple to use service set, thereby simplifying the developer's task regarding inclusion of strong security features in application and infrastructure programs.

SUMMARY OF THE INVENTION

Systems and methods consistent with the present invention address these and other needs by integrating cryptographic-related functions in a software-based tool. The software-based tool includes a standardized interface that may be used by program developers for requesting the desired functions. The tool may also be customized to include any cryptographic-related functions based on the requirements of the particular user/system.

In accordance with the purpose of the invention as embodied and broadly described herein, a method for performing cryptographic-related functions in a network node is provided. The method includes receiving an input requiring cryptographic-related processing and generating a message based on the input. The message represents one of a predefined set of messages for processing by a cryptographic processing component. The method also includes transmitting the message to the cryptographic processing component and performing the cryptographic-related processing.

In another aspect of the present invention, a computer-readable medium, having sequences of instructions stored thereon is provided. The instructions may be invoked by a plurality of predefined messages and include sequences of instructions which, when executed by a processor, cause the processor to receive an input representing one of the predefined messages. The instructions also cause the processor to transmit, based on the input, a request for cryptographic-related processing to a cryptographic processing module. The instructions further cause the processor to perform the cryptographic-related processing.

In still another aspect of the present invention, a cryptographic module is provided. The cryptographic module includes a memory configured to store a plurality of cryptographic processing programs where each program is invoked via one of a plurality of predefined messages. The cryptographic module also includes a processor configured to receive an input requiring cryptographic-related processing, generate one of the predefined messages based on the input, and transmit the message to a first one of the cryptographic processing programs. The processor is also configured to perform the cryptographic-related processing.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide cryptographic-related functions in a software-based tool that may be used by an applications or network developer. The developer requests a particular function using a predefined set of messages transmitted to the software-based tool via a function call. The software-based tool then performs the desired cryptographic-related function.

Exemplary System Configuration

Figure 1:
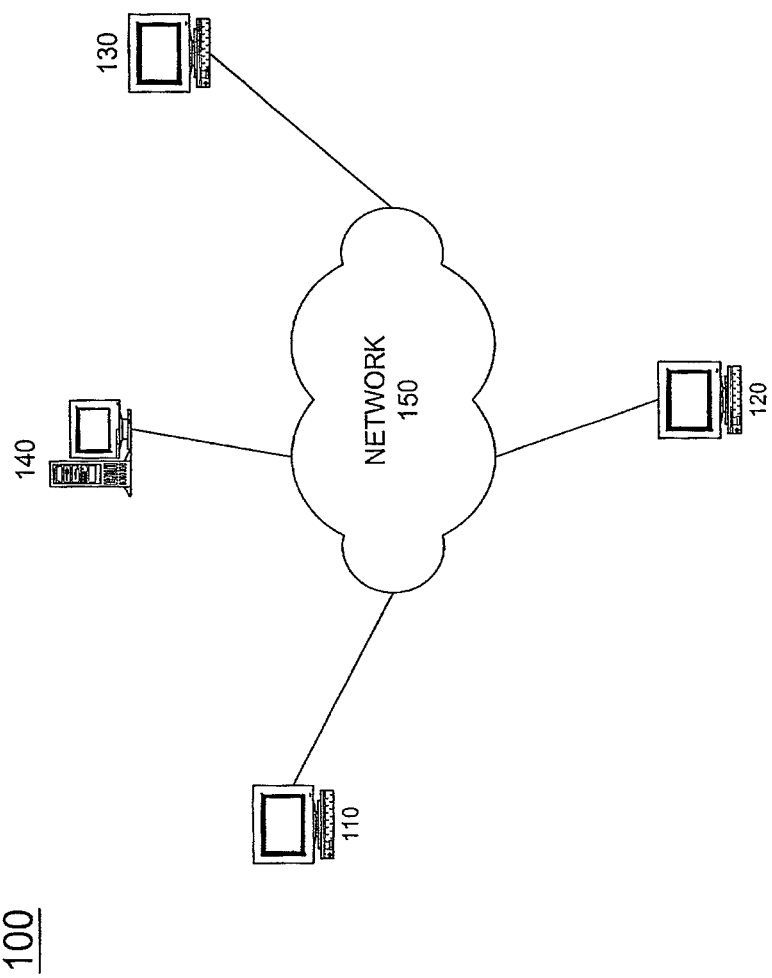
FIG. 1 is a block diagram of an exemplary system in which an implementation consistent with the present invention may be employed.

FIG. 1 is a diagram of an exemplary system 100 in which implementations of the present invention may be employed. The system 100 includes nodes 110, 120 and 130, server 140 and network 150.

Each of the nodes 110, 120 and 130 may include any type of computer device, such as a personal computer, a laptop, a personal digital assistant (PDA) or a similar device, with a connection to network 150. In an exemplary implementation of the present invention, the nodes 110-130 transmit/receive messages to/from other nodes over network 150 via wired, wireless, or optical connections. The network 150 may include the Internet, a local area network (LAN), wide area network (WAN), intranet or another type of network. Only three nodes are shown for simplicity. It should be understood, however, that any number of nodes may be included in system 100.

The server 140 may store certificates, public key information or other information required to verify/encrypt messages. For example, the server 140 may be a conventional lightweight directory access protocol (LDAP) server, an X.500 server or another type of server that stores certificates, certificate revocation lists (CRLs), or similar information. The nodes 110-130 may access the server 140 to retrieve various information needed to perform the authentication/verification functions, as described in more detail below.

Exemplary Node

Figure 2:
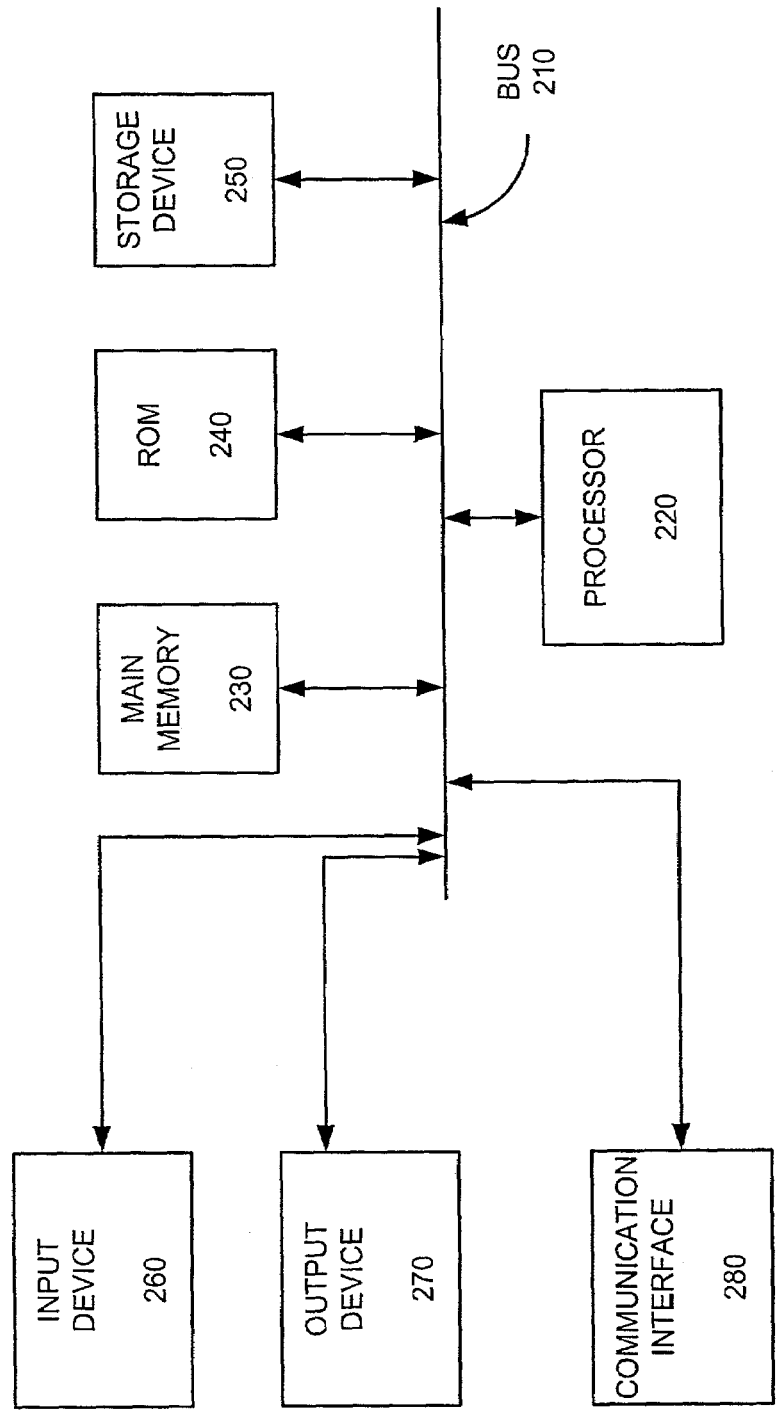
FIG. 2 is an exemplary block diagram of a node of FIG. 1 in which systems and methods consistent with the present invention may be employed.

FIG. 2 illustrates an exemplary node 110 of FIG. 1 in which methods and systems consistent with the present invention may be implemented. Node 110 includes a bus 210, a processor 220, a main memory 230, a read only memory (ROM) 240, a storage device 250, an input device 260, an output device 270, and a communication interface 280. The bus 210 permits communication among the components of the node 110.

The processor 220 may include any type of conventional processor or microprocessor that interprets and executes instructions. Main memory 230 may be a random access memory (RAM) or another type of dynamic storage device that stores information and instructions for execution by processor 220. Main memory 230 may also store temporary variables or other intermediate information used during execution of instructions by processor 220. The ROM 240 may include a conventional ROM device or another type of static storage device that stores static information and instructions for processor 220. The storage device 250 may include any type of magnetic or optical recording medium and its corresponding drive, such as a magnetic disk or optical disk and its corresponding disk drive.

The input device 260 may include any conventional mechanism that permits an operator to input information to the node 110, such a keyboard, a mouse, a pen, voice recognition and/or biometric mechanisms, etc. The output device 270 may include any conventional mechanism that outputs information to the operator, including a display, a printer, a pair of speakers, etc. The communication interface 280 may include any transceiver-like mechanism that enables the node 110 to communicate with other devices and/or systems. For example, the communication interface 280 may include a modem or an Ethernet interface for communicating via a LAN. Alternatively, the communication interface 280 may include other mechanisms for communicating via a network, such as network 150.

Node 110, consistent with the present invention, performs cryptographic-related functions in response to processor 220 executing sequences of instructions contained in a computer readable medium, such as memory 230. A computer-readable medium may include one or more memory devices and/or carrier waves. Such instructions may be read into memory 230 from another computer-readable medium, such as a data storage device 250, or from a separate device via communication interface 280. Execution of the sequences of instructions contained in memory 230 causes processor 220 to perform the process steps that will be described hereafter. In alternative embodiments, hard-wired circuitry may be used in place of or in combination with software instructions to implement the present invention. Thus, the present invention is not limited to any specific combination of hardware circuitry and software.

Exemplary Node Components

Figure 3:
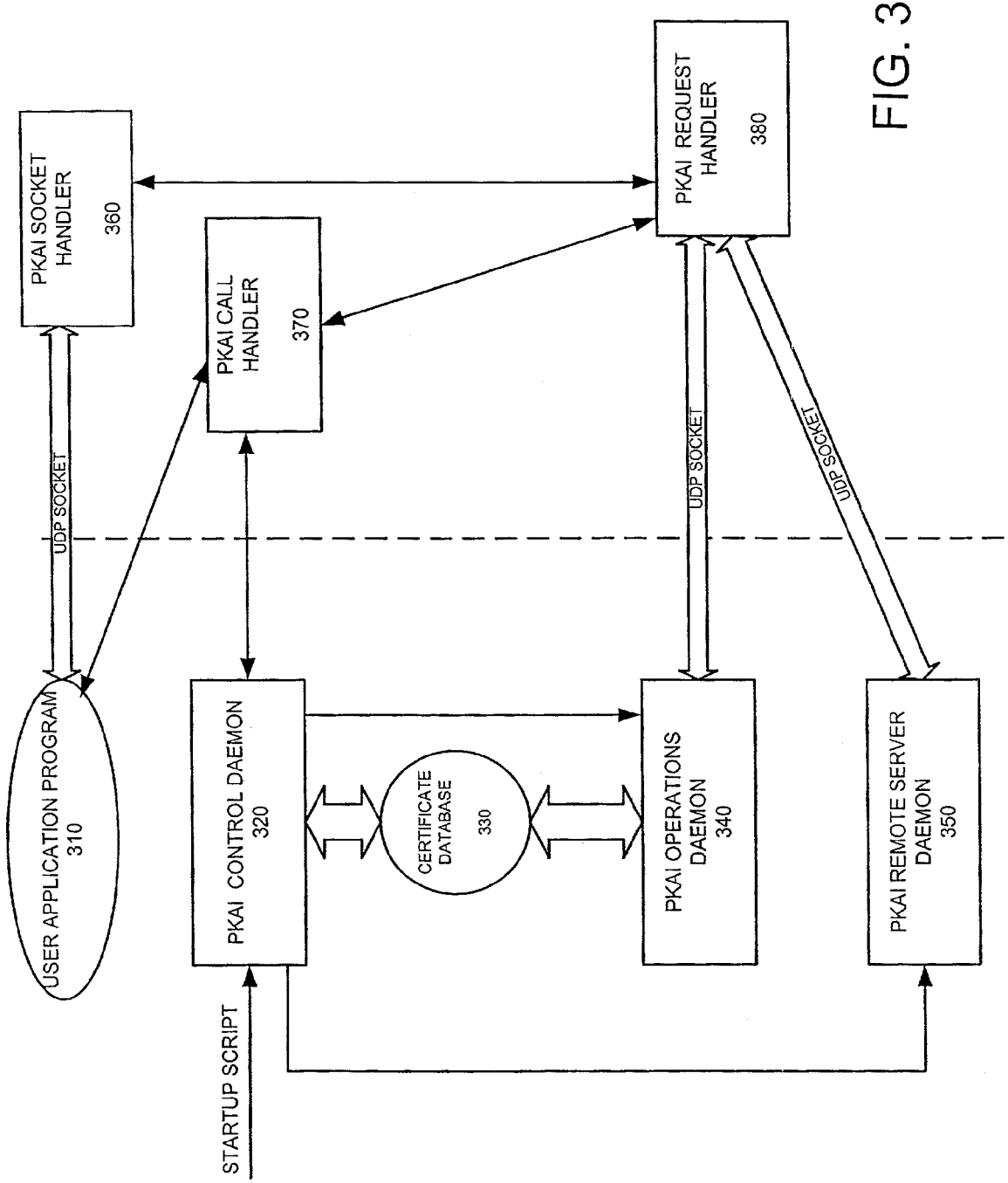
FIG. 3 illustrates user space components and kernel space components consistent with an implementation of the present invention.

FIG. 3 schematically illustrates the user space components and kernel space components in node 110, in an exemplary implementation consistent with the present invention. In the exemplary implementation, the user space components may reside in any one of or a combination of main memory 230, ROM 240 and storage device 250. In addition, the kernel space components may reside in any one of or a combination of main memory 230, ROM 240 and storage device 250. Additionally, both the user space components and kernel space components may interact with the other devices in node 110, such as processor 220.

The user space components and kernel space components are shown separated by a dotted line in FIG. 3. The user space components include user application program 310, public key authentication infrastructure (PKAI) control daemon 320, certificate database 330, PKAI operations daemon 340 and PKAI remote server daemon 350. The kernel space components include PKAI socket handler 360, PKAI call handler 370 and PKAI request handler 380.

The PKAI control daemon 320 initializes and shuts down PKAI services. A startup script may invoke the PKAI control daemon 320 with "start" and an optional pass phrase. The PKAI control daemon 320 may initialize the PKAI operations daemon 340 and the PKAI remote server daemon 350. In addition, the PKAI control daemon 320 shuts down the PKAI operations and remote server daemons 340 and 350 when the PKAI shuts down, such as when power to the node 110 is terminated.

The PKAI operations daemon 340 may communicate with PKAI request handler 380 via a user datagram protocol (UDP) socket. The PKAI operations daemon 340 performs local disk input/output on behalf of PKAI request handler 380. For example, the PKAI request handler 380 may use PKAI operations daemon 340 to store X.509 certificates to memory and retrieve X.509 digital certificates from memory, such as certificates database 330.

The PKAI remote server daemon 350 may also communicate with PKAI request handler via a UDP socket. The PKAI remote server daemon 350 retrieves information on behalf of PKAI request handler 380. For example, the PKAI remote server daemon 350 may retrieve X.509 digital certificates and certificate revocation lists (CRLs) from a network accessible server, such as server 140 (FIG. 1). The PKAI remote server daemon 350 may store these certificates and CRLs in certificate database 330.

The PKAI system socket handler 360 may communicate with user application program 310 over a UDP socket. For example, the communication may include a request for cryptographic-related services, as discussed in more detail below. In this situation, the PKAI socket handler 360 generates a corresponding function call to the PKAI request handler 380 to perform the desired function. The PKAI call handler 370 may also receive system service calls from user application program 310 and PKAI control daemon 320. The PKAI call handler 370 then generates a corresponding function call to the PKAI request handler 380, based on the particular request.

Figure 4:
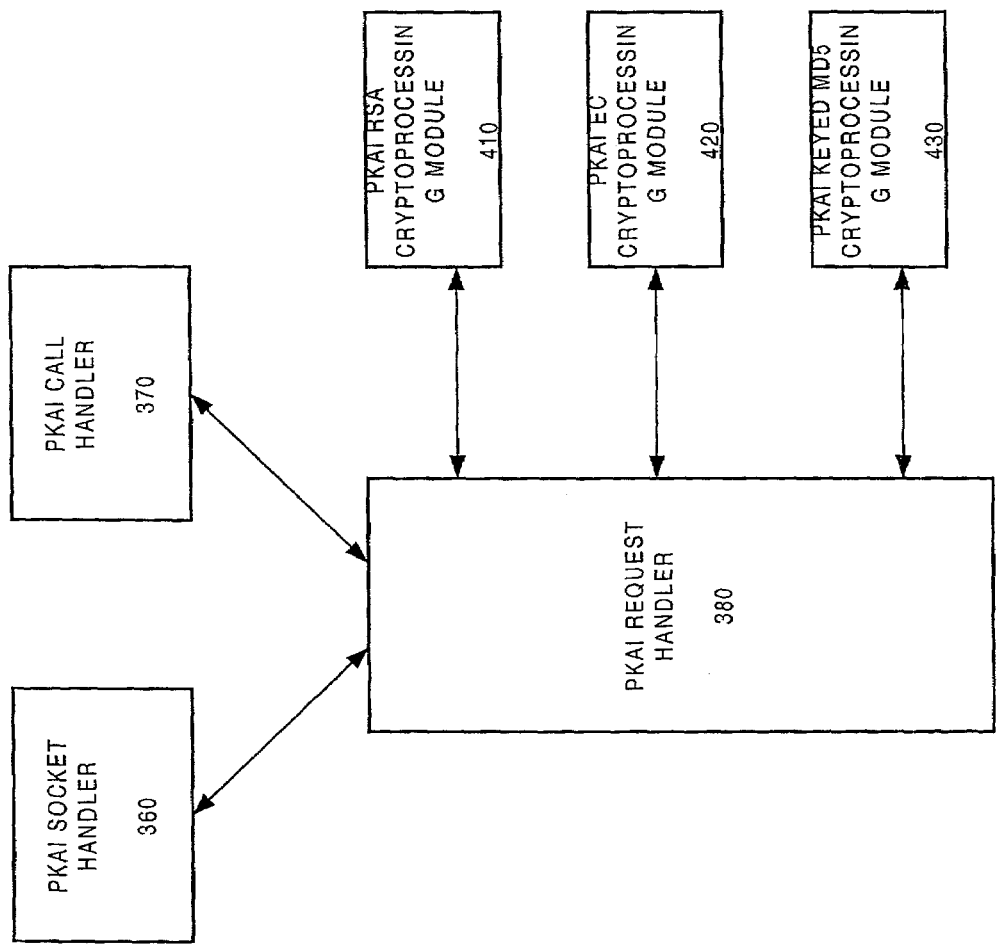
FIG. 4 is an exemplary diagram of kernel space components consistent with an implementation of the present invention.

FIG. 4 illustrates the PKAI components of FIG. 3 residing in the kernel space along with three cryptographic processing components, consistent with an exemplary implementation of the present invention. In an exemplary implementation, the cryptographic processing components are compiled into the kernel during a kernel re-build and their functionality invoked via a system service function call.

The kernel components illustrated in FIG. 4 include PKAI socket handler 360, PKAI call handler 370, PKAI request handler 380, PKAI RSA cryptoprocessing module 410, PKAI elliptic curve (EC) cryptoprocessing module 420 and PKAI keyed message digest algorithm 5 (MD5) cryptoprocessing module 430. Only three cryptoprocessing modules are shown for simplicity. Other cryptoprocessing modules may be included in the kernel space based on the particular user/system requirements. Additionally, the details of the particular cryptoprocessing modules used in implementations of the present invention, such as modules 410-430, would be obvious to one of ordinary skill in this art and are not described herein.

Referring back to FIG. 3, a system service function call may be initiated by user application program 310 via the UDP socket to PKAI socket handler 360 or by a system service call directly to the PKAI call handler 370. The system service function call may also be initiated by PKAI control daemon 320 to PKAI call handler 370. Other methods of invoking the PKAI functions may also be used in alternative implementations. For example, the PKAI cryptographic-related functions may be invoked by any number of conventional call mechanisms based on the particular user/system requirements. In each case, the network or applications programmer need only be aware of the particular set of predefined messages needed to invoke the desired function. These messages are then incorporated into the user application program 310 as required.

As described above, the PKAI request handler 380 may receive requests for cryptographic-related services from a number of sources. In each situation, the PKAI request handler 380 receives the request and generates a function call to the appropriate cryptoprocessing module, such as one of cryptoprocessing modules 410-430. The details of performing the particular cryptographic-related functions are described in more detail below.

Exemplary Processing for Providing Cryptographic-Related Functions

Figure 5:
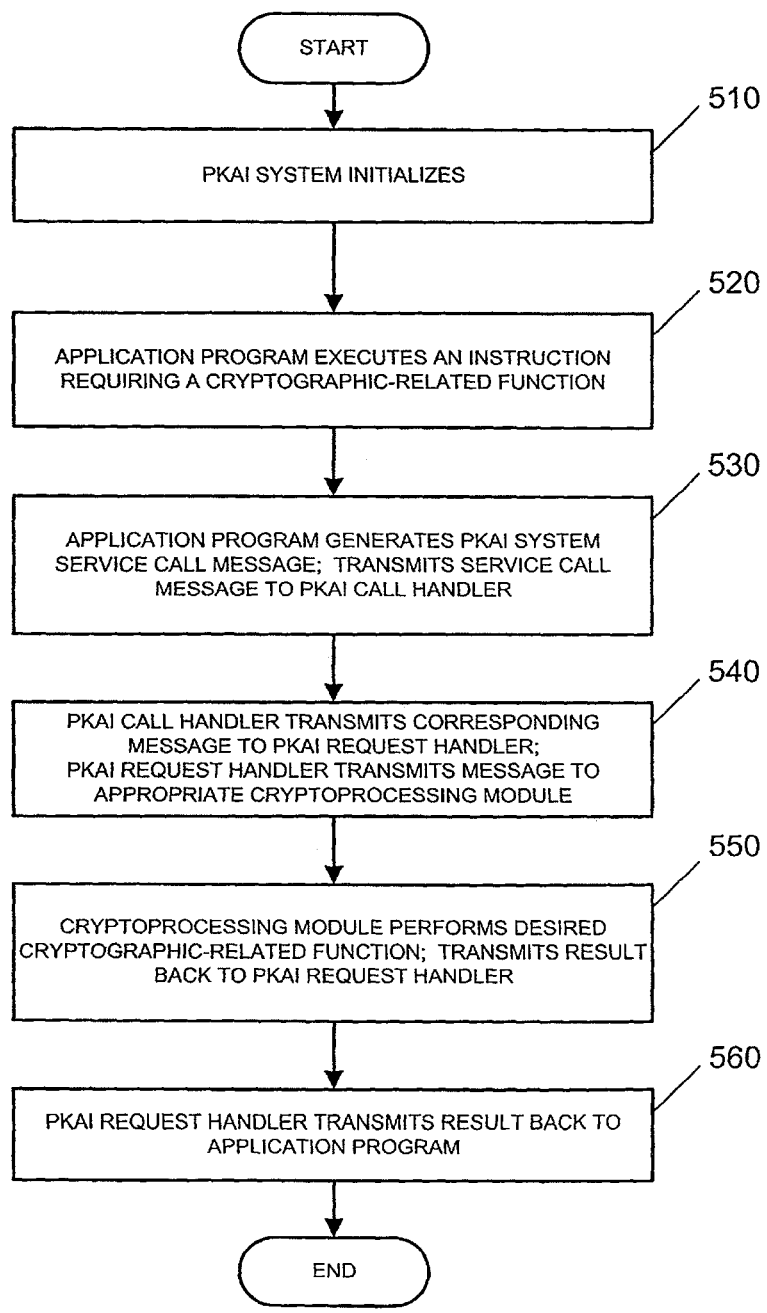
FIG. 5 is a flowchart of processing for providing cryptographic-related functions in a manner consistent with the present invention.

FIG. 5 illustrates processing associated with performing cryptographic-related functions using the PKAI system. Processing begins with initialization of the PKAI system (step 510). The PKAI system may be initialized by a startup script that is executed after node 110 is powered up. After the PKAI system begins operating, the control daemon, operations daemon and remote server daemons 320, 340 and 350, respectively, operate as described with regard to FIGS. 3 and 4.

Assume that the user application program 310 executes an instruction requiring cryptographic-related processing (step 520). Such an instruction may, for example, require verifying a digital signature transmitted with a certificate using an RSA, MD5, EC or digital signature standard (DSS) algorithm or generating an RSA, MD5, EC or DSS digital signature. The instruction may also require encrypting or decrypting data using an RSA, EC or other cryptographic algorithm. The instruction may further require retrieving a digital certificate or certificate revocation list from either the user space components or a remote server, such as server 140. The instruction may also include verifying a certificate's hierarchy, performing self-signed certificate processing, performing certificate age checking, or retrieving, verifying and storing a digital certificate in the node. In essence, the instruction may require performing any cryptographic-related function, based on the system requirements.

The user application program 310, after executing the instruction, generates a system service call to PKAI call handler 370 (step 530). The system service call, consistent with the present invention, may be chosen from a predefined list of messages that are used to invoke PKAI services. For example, assume that the request is for verifying an RSA 512 bit digital signature transmitted with a certificate. In this case, the predefined message may be PKAI_RSA512ver. In this scenario, the user application program 310 may then transmit PKAI_RSA512ver to the PKAI call handler 370. The PKAI call handler 370 receives the request and forwards a corresponding function call to the PKAI request handler 380 (step 540).

In the example, the PKAI call handler 370 may transmit PKAI_RSA52ver_req to the PKAI request handler 380. The PKAI request handler 380 may then transmit the request message to the appropriate cryptoprocessing module for processing (step 540). In this example, the PKAI request handler 380 transmits PKA_RSA512ver_req to PKAI RSA cryptoprocessing module 410 (FIG. 4). The PKAI RSA cryptoprocessing module 410 then performs the desired function, i.e., verifies the status of the RSA 512 bit digital signature transmitted with the certificate (step 550). The PKAI RSA cryptoprocessing module 410 then transmits the result to the PKAI request handler 380 (step 550). After receiving the result, the PKAI request handler 380 forwards the result back to the user application program 310 that initiated the request (step 560). The result may optionally be transmitted to the user application program 310 via the PKAI call handler 370.

Systems and methods consistent with the present invention enable applications and network programmers to incorporate any required cryptographic-related processing by merely incorporating the desired call message. An advantage of the invention is that the applications or network programmer is able to incorporate complex security features without having to gain detailed knowledge of complex secret and public key algorithms. Appendix A illustrates an exemplary set of PKAI function call messages that may be used in an implementation consistent with the present invention. It should be understood that additional function call messages may be used in alternative implementations consistent with the present invention.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the PKAI system has been described as being resident in one of the network nodes that receives/transmits messages. In alternative implementations, the PKAI system may be located remotely from the network node. The scope of the invention is defined by the claims and their equivalents.

What is claimed is:

1. A method comprising:
    executing, by a device, an instruction of an application program,
        the instruction requiring cryptographic-related processing;
    generating, by the device and using the application program, a first message,
        the first message corresponding to a message of a plurality of messages,
            each of the plurality of messages invoking a different cryptographic-related processing,
            the plurality of messages being stored in the device,
            the message, of the plurality of messages, relating to the cryptographic-related processing required by the instruction,
            the first message being transmitted to an authentication call component or an authentication socket component in a kernel space of the device;
    generating, by the device and using the authentication call component or the authentication socket component, a second message that is transmitted to an authentication request component in the kernel space,
        the second message being based on the first message;
    transmitting, by the device and using the authentication request component, the second message to a cryptographic processing component of a plurality of cryptographic processing components in the kernel space,
        each of the plurality of cryptographic processing components being associated with a different type of cryptographic-related processing,
        the second message being transmitted to the cryptographic processing component based on the cryptographic processing component being associated with a type of the cryptographic-related processing; and
    performing, by the device and using the cryptographic processing component, the cryptographic-related processing required by the instruction based on the second message.

2. The method of claim 1, where performing the cryptographic-related processing includes at least one of:
    verifying or generating a digital signature;
    encrypting data;
    decrypting data;
    retrieving a digital certificate or certificate revocation list;
    verifying a hierarchy of a certificate;
    performing self-signed certificate processing;
    retrieving, verifying, and storing a digital certificate in the device; or
    performing certificate age checking.

3. The method of claim 1, further comprising:
    transmitting the first message to the authentication socket component in the kernel space,
        where transmitting the first message includes:
            generating a user datagram protocol (UDP) message containing an identifier associated with the cryptographic-related processing, and
            transmitting the UDP message via a UDP socket to the authentication socket component.

4. The method of claim 1, further comprising:
    transmitting a result of performing the cryptographic-related processing to the authentication request component.

5. The method of claim 4, further comprising:
    transmitting the result of performing the cryptographic-related processing from the authentication request component to the application program,
        the application program being in a user space of the device.

6. The method of claim 1, where the instruction is associated with an input that represents a digitally signed network control message requiring verification.

7. A device, comprising:
    a memory to store:
        a plurality of instructions, and
        a plurality of public key authentication infrastructure (PKAI) function call messages,
            each of the plurality of PKAI function call messages invoking a different PKAI function; and
    a processor to execute the plurality of instructions in the memory to:
        receive an input requiring performance of a cryptographic-related function,
            the input being received based on execution of an application program;
        generate, within the device and based on the input, a particular PKAI function call message based on the plurality of PKAI function call messages stored in the memory,
            the particular PKAI function call message relating to the cryptographic-related function,
            the particular PKAI function call message being forwarded to an authentication call component in a kernel space of the device;
        generate, using the authentication call component, another message based on the particular PKAI function call message,
            the other message relating to the cryptographic-related function;
        forward the other message to an authentication request component in the kernel space of the device,
            the authentication request component identifying a cryptographic processing component, of a plurality of cryptographic processing components in the kernel space, for performing the cryptographic-related function,
                each of the plurality of cryptographic processing components being associated with a different type of cryptographic-related function, and
            the authentication request component forwarding the other message to the cryptographic processing component based on the cryptographic processing component being associated with a type of the cryptographic-related function; and
cause the cryptographic-related function to be performed by the cryptographic processing component based on the other message.

8. The device of claim 7, where, when causing the cryptographic-related function to be performed, the processor is to cause at least one of:
a digital signature to be verified or generated;
data to be encrypted;
data to be decrypted;
a digital certificate or certificate revocation list to be retrieved;
a hierarchy of a certificate to be verified;
self-signed certificate processing to be performed;
a digital certificate to be retrieved, verified, and stored; or
certificate age checking to be performed.

9. The device of claim 7, where the processor further executes the plurality of instructions in the memory to:
transmit a result of the cryptographic processing component performing the cryptographic-related function to the authentication request component.

10. The device of claim 7, where the processor further executes the plurality of instructions in the memory to:
return a result of performing the cryptographic-related function to the application program.

11. The device of claim 7, where, when performing the cryptographic-related function, the cryptographic processing component is to:
access a remote server, via a network, to retrieve cryptographic-related information.

12. A network node comprising:
a user space component, implemented at least partially in hardware, to:
execute an instruction requiring performance of a cryptographic-related function, and
generate a first message corresponding to a particular message of a plurality of messages stored in the network node,
each of the plurality of messages invoking a different cryptographic-related function,
the first message relating to the performance of the cryptographic-related function;
a first kernel space component, implemented at least partially in hardware, to:
receive the first message, relating to the cryptographic-related function, from the user space component, and
generate a second message, corresponding to the first message, as part of a function call; and
a second kernel space component, implemented at least partially in hardware, to:
receive the second message generated as part of the function call, and
forward, based on the function call, the second message to a cryptographic processing component of a plurality of cryptographic processing components within a kernel space of the network node,
each of the plurality of cryptographic processing components being associated with a different type of cryptographic-related function,
the second message being forwarded to the cryptographic processing component based on a type of the cryptographic-related function,
the cryptographic processing component performing the cryptographic-related function based on the second message.

13. The network node of claim 12, further comprising:
another user space component to initialize or shut down a cryptographic-related service associated with the cryptographic-related function.

14. The network node of claim 13, further comprising:
a third kernel space component to:
receive a request, from the other user space component, to perform another cryptographic-related function requested by the user space component, and
generate a function call corresponding to performing the other cryptographic-related function.

15. The network node of claim 12, further comprising:
another user space component to access a remote server, via a network, to retrieve cryptographic-related information,
the cryptographic-related information being associated with the cryptographic-related function.

16. The network node of claim 12, where, when performing the cryptographic-related processing, the cryptographic processing component is to at least one of:
verify or generate a digital signature;
encrypt data;
decrypt data;
retrieve a digital certificate or certificate revocation list;
verify a certificate's hierarchy;
perform self-signed certificate processing;
retrieve, verify, and store a digital certificate in the network node; or
perform certificate age checking.

17. The network node of claim 12, where the function call is a user datagram protocol (UDP) message containing an identifier associated with the cryptographic-related function.

18. The network node of claim 12, where the second kernel space component is further to:
receive a result, from the cryptographic processing component, of the cryptographic processing component performing the cryptographic-related function, and
forward the result to the user space component.

* * * * *